United States Patent
Noro (10) Patent No.: US 11,373,502 B2
(45) Date of Patent: Jun. 28, 2022

(54) VEHICLE ALERT APPARATUS

(71) Applicant: DENSO CORPORATION, Kariya (JP)

(72) Inventor: Tetsushi Noro, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/941,430

(22) Filed: Jul. 28, 2020

(65) Prior Publication Data
US 2020/0365003 A1    Nov. 19, 2020

Related U.S. Application Data

(63) Continuation of application No. PCT/JP2018/046563, filed on Dec. 18, 2018.

(30) Foreign Application Priority Data

Jan. 31, 2018   (JP) .............................. JP2018-014957

(51) Int. Cl.
  G08B 23/00     (2006.01)
  G08B 21/06     (2006.01)
  (Continued)

(52) U.S. Cl.
  CPC ............ G08B 21/06 (2013.01); B60K 28/066 (2013.01); B60W 40/09 (2013.01);
  (Continued)

(58) Field of Classification Search
  CPC ..... G08B 21/06; B60K 28/066; B60W 40/09; B60W 40/105; B60W 50/14;
  (Continued)

(56) References Cited

U.S. PATENT DOCUMENTS 5,815,070 A * 9/1998 Yoshikawa ............ G08B 21/06
                                                    340/576
5,821,860 A * 10/1998 Yokoyama ............. G08B 21/06
                                                    340/576
(Continued)

FOREIGN PATENT DOCUMENTS

JP      H08290726 A     11/1996
JP      2003226227 A     8/2003
(Continued)

OTHER PUBLICATIONS

Ahir et al., Driver Inattention Monitoring System A Review (Year: 2019).*

(Continued)

*Primary Examiner* — Quang Pham
(74) *Attorney, Agent, or Firm* — Harness, Dickey & Pierce, P.L.C.

(57) ABSTRACT

A vehicle alert apparatus includes: a drowse detector that detects drowse of a driver; an inattention detector that detects inattention of the driver; a vehicle speed detector that detects the vehicle speed; a notification portion that executes alert for the driver; and an alert controller that controls the alert executed by the notification portion based on a detection result of the drowse of the driver, a detection result of the inattention of the driver, or a detection result of the vehicle speed.

7 Claims, 9 Drawing Sheets

(51) Int. Cl.
*B60K 28/06* (2006.01)
*B60W 40/09* (2012.01)
*B60W 40/105* (2012.01)
*B60W 50/14* (2020.01)
*B60W 40/08* (2012.01)

(52) U.S. Cl.
CPC .......... *B60W 40/105* (2013.01); *B60W 50/14* (2013.01); *B60W 2040/0827* (2013.01); *B60W 2050/143* (2013.01); *B60W 2540/229* (2020.02); *B60W 2540/26* (2013.01)

(58) Field of Classification Search
CPC ... B60W 2540/229; B60W 2040/0827; B60W 2050/143; B60W 2540/26
See application file for complete search history.

(56) References Cited

U.S. PATENT DOCUMENTS

| | | | | |
|---|---|---|---|---|
| 7,184,873 B1* | 2/2007 | Idsinga | ............... | B60W 30/146 701/93 |
| 7,710,249 B2* | 5/2010 | Park | ............... | G08B 21/06 340/438 |
| 8,041,493 B2* | 10/2011 | Seto | ............... | B60K 31/00 340/441 |
| 8,618,952 B2* | 12/2013 | Mochizuki | ....... | G08G 1/096783 340/995.25 |
| 8,742,936 B2* | 6/2014 | Galley | ............... | B60K 28/066 340/576 |
| 8,983,750 B2* | 3/2015 | Maruyama | ........... | B60W 50/14 701/93 |
| 9,315,194 B2* | 4/2016 | Okuda | ............... | G08B 21/06 |
| 9,937,923 B2* | 4/2018 | Custer | ............... | G08G 1/015 |
| 10,272,926 B2* | 4/2019 | Yamashita | ............ | B60W 30/165 |
| 2001/0037171 A1* | 11/2001 | Sato | ............... | B60T 8/00 701/70 |
| 2002/0101354 A1* | 8/2002 | Banas | ............... | G08B 21/06 340/576 |
| 2002/0105438 A1* | 8/2002 | Forbes | ............... | G07C 5/0891 340/901 |
| 2003/0105578 A1* | 6/2003 | Takenaga | ............ | G08G 1/167 340/995.13 |
| 2003/0151516 A1* | 8/2003 | Basir | ............... | G08B 21/06 600/300 |
| 2004/0201481 A1* | 10/2004 | Yoshinori | ............ | B60N 2/0244 340/575 |
| 2005/0065711 A1* | 3/2005 | Dahlgren | ......... | G08G 1/096775 701/117 |
| 2005/0219058 A1* | 10/2005 | Katagiri | ............ | G08B 21/06 340/576 |
| 2006/0142968 A1* | 6/2006 | Han | ............... | A61B 5/16 702/120 |
| 2007/0080816 A1* | 4/2007 | Haque | ............... | B60K 28/066 340/576 |
| 2007/0168128 A1* | 7/2007 | Tokoro | ............... | G01S 13/867 701/301 |
| 2007/0265777 A1* | 11/2007 | Munakata | ............ | G01S 13/931 701/469 |
| 2009/0115589 A1* | 5/2009 | Galley | ............... | A61B 5/18 340/439 |
| 2009/0132143 A1* | 5/2009 | Kamiya | ............... | B60T 7/22 701/96 |
| 2009/0318776 A1* | 12/2009 | Toda | ............... | B60W 40/08 340/576 |
| 2010/0007480 A1 | 1/2010 | Uozumi et al. | | |
| 2010/0049068 A1* | 2/2010 | Fuwamoto | ............ | A61B 5/30 600/509 |
| 2010/0094103 A1* | 4/2010 | Kaplan | ............... | A61M 21/00 600/26 |
| 2010/0188233 A1* | 7/2010 | Kuntzel | ............ | G08B 21/06 340/575 |
| 2010/0207751 A1* | 8/2010 | Follmer | ............ | G01C 21/32 340/439 |
| 2010/0217099 A1* | 8/2010 | LeBoeuf | ............... | A61B 5/002 600/301 |
| 2011/0105925 A1* | 5/2011 | Hatakeyama | ........... | A61B 5/16 600/509 |
| 2011/0144515 A1* | 6/2011 | Bayer | ............... | G01N 33/497 600/529 |
| 2011/0163863 A1* | 7/2011 | Chatmon | ............... | B60Q 9/008 340/439 |
| 2012/0025993 A1* | 2/2012 | Akiyama | ............... | B60K 28/06 340/576 |
| 2012/0133515 A1* | 5/2012 | Palshof | ............... | B60W 50/14 340/575 |
| 2012/0253628 A1* | 10/2012 | Maruyama | ........... | B60W 50/085 701/93 |
| 2013/0113910 A1* | 5/2013 | Kim | ............... | B60K 28/066 348/E7.085 |
| 2013/0144470 A1* | 6/2013 | Ricci | ............... | H04W 8/22 701/2 |
| 2014/0309881 A1* | 10/2014 | Fung | ............... | B60W 40/09 701/36 |
| 2015/0029014 A1* | 1/2015 | Bande Martinez | .... | G08B 21/02 340/439 |
| 2016/0196098 A1* | 7/2016 | Roth | ............... | G09G 5/00 715/761 |
| 2017/0106858 A1* | 4/2017 | Li | ............... | B60W 10/18 |
| 2017/0183006 A1* | 6/2017 | Chack | ............... | G01S 19/52 |
| 2018/0057015 A1* | 3/2018 | Barke | ............... | B60W 50/085 |
| 2018/0061232 A1* | 3/2018 | Madigan | ............... | H04W 4/50 |
| 2018/0105180 A1* | 4/2018 | Fung | ............... | B62D 6/00 |
| 2018/0357894 A1* | 12/2018 | Bjersing | ............... | G08G 1/0141 |
| 2018/0365986 A1* | 12/2018 | Prasad | ............... | G08G 1/054 |

FOREIGN PATENT DOCUMENTS

| | | | |
|---|---|---|---|
| JP | 2006268189 A | | 10/2006 |
| JP | 2007226666 A | | 9/2007 |
| JP | 2008097445 A | * | 4/2008 |
| JP | 2009116394 A | * | 5/2009 |
| JP | 3207515 U | | 11/2016 |
| JP | 2017151606 A | | 8/2017 |
| JP | 2017208007 A | | 11/2017 |

OTHER PUBLICATIONS

Bergasa et al., DriveSafe An app for alerting inattentive drivers and scoring driving behaviors (Year: 2018).*
Calinescu et al., Maintaining driver attentiveness in shared-control autonomous driving (Year: 2021).*
Nishigaki et al., Driver attention level estimation using driver model identification (Year: 2019).*
Ou et al., Driver Behavior Monitoring Using Tools of Deep Learning and Fuzzy Inferencing (Year: 2018).*
Chang et al., Vision-based onboard unit for inattentive driving warning and car-following control (Year: 2010).*
Hitendra Garg, Drowsiness Detection of a Driver using Conventional Computer Vision Application (Year: 2020).*
Maiti et al., An innovative prototype to prevent accidents using eye blink sensors and accelerometer ADXL330 (Year: 2015).*
Naz et al., Intelligent driver safety system using fatigue detection (Year: 2017).*
Ovcharova et al., Effectiveness of forward collision warnings for different driver attention states (Year: 2012).*
Rusmin et al., Design and implementation of driver drowsiness detection system on digitalized driver system (Year: 2013).*
Santos et al., Evaluating the Effect of Audio Feedback on the Behavior of Automotive Fatigue and Distraction Detection System Users (Year: 2019).*
Bartra et al., A feasability study of drowsiness detection using driving behaviour parameters (Year: 2012).*
Dong et al., Driver Inattention Monitoring System for Intelligent Vehicles A Review (Year: 2011).*
Jain et al., Neural Network Based Driver Warning System (Year: 2020).*

(56) References Cited

OTHER PUBLICATIONS

Kang et al., Various Approaches for Driver and Driving Behavior Monitoring A Review (Year: 2013).*
Lindow et al., AI-Based Driving Data Analysis for Behavior Recognition in Vehicle Cabin (Year: 2020).*
Nguyen et al., Eye tracking system to detect driver drowsiness (Year: 2015).*
Ed-Doughmi et al., Real-Time System for Driver Fatigue Detection Based on a Recurrent Neuronal Network (Year: 2020).*
Galarza et al., Real Time Driver Drowsiness Detection Based on Driver's Face Image Behavior Using a System of Human Computer Interaction Implemented in a Smartphone (Year: 2018).*
Sahayadhas et al., Detecting Driver Drowsiness Based on Sensors A Review (Year: 2012).*

* cited by examiner

|  | LOOKING ASIDE | NOT LOOKING ASIDE |
|---|---|---|
| DROWSING | ALERT OFF | ALERT OFF |
| NOT DROWSING | ALERT OFF | ALERT OFF |

FIG. 5

$0 < V \leq V_{th}$

|  | LOOKING ASIDE | NOT LOOKING ASIDE |
|---|---|---|
| DROWSING | ALERT ON | ALERT ON |
| NOT DROWSING | ALERT OFF | ALERT OFF |

|  | LOOKING ASIDE | NOT LOOKING ASIDE |
|---|---|---|
| DROWSING | ALERT ON | ALERT ON |
| NOT DROWSING | ALERT ON | ALERT OFF |

VEHICLE ALERT APPARATUS

CROSS REFERENCE TO RELATED APPLICATIONS

The present application is a continuation application of International Patent Application No. PCT/JP2018/046563 filed on Dec. 18, 2018, which designated the U.S. and claims the benefit of priority from Japanese Patent Application No. 2018-014957 filed on Jan. 31, 2018. The entire disclosures of all of the above applications are incorporated herein by reference.

TECHNICAL FIELD

The present disclosure relates to a vehicle alert apparatus.

BACKGROUND

Traffic accidents caused by sleepiness or inattentiveness of a driver are a social problem. Detecting a state of the sleepiness or the inattentiveness and alerting the driver can contribute to reduction in the traffic accidents. On the other hand, there is a trade-off relation between an alert frequency and troublesomeness of the driver. In a case where the alert is unnecessary, when the driver is alerted, the driver feels very troublesome with the alert.

SUMMARY

A vehicle alert apparatus may include: a drowse detector that may detect drowse of a driver; an inattention detector that may detect inattention of the driver; a vehicle speed detector that may detect the vehicle speed; a notification portion that may execute alert for the driver; and an alert controller that may control the alert executed by the notification portion based on a detection result of the drowse of the driver, a detection result of the inattention of the driver, or a detection result of the vehicle speed.

BRIEF DESCRIPTION OF DRAWINGS

The above and other features and advantages of the present disclosure will become more apparent from the following detailed description made with reference to the accompanying drawings. In the drawings.

DESCRIPTION OF EMBODIMENTS

In a comparative example 1, an apparatus detects that the driver falls asleep (drowses) and does not execute the alert for the drowse when there is no problem even in a case where the driver drowses. When there is no problem while the driver drowses, the apparatus executes determination based on three vehicle signals from a vehicle wheel speed sensor, a gear sensor, and a side brake sensor. However, there is a problem that the apparatus described above can only alert the driver to the drowse and does not alert the driver when the driver looks aside.

In a comparative example 2, an apparatus detects that the driver drowses or looks aside and alerts the driver. However, the apparatus described above executes the alert even while the vehicle stops or the vehicle moves at a very low speed for searching a parking position or the like in a parking lot. Therefore, the drive may feel troublesome with the alert.

One example of the present disclosure provides a vehicle alert apparatus capable of alerting a driver when the driver drowses and also preventing a situation where the driver feels troublesome with the alert as much as possible.

According to one example embodiment, a vehicle alert apparatus includes: a drowse detector that detects drowse of a driver; an inattention detector that detects inattention of the driver; a vehicle speed detector that detects the vehicle speed; a notification portion that executes alert for the driver; and an alert controller that controls the alert executed by the notification portion based on a detection result of the drowse of the driver, a detection result of the inattention of the driver, or a detection result of the vehicle speed. The alert controller controls the alert in accordance with a determination level for the detection result of the vehicle speed. The determination level is sectioned by a threshold value of the vehicle speed. In a case where the vehicle speed is equal to or lower than the threshold value, the alert controller causes the notification portion to execute the alert when the drowse of the driver is detected, and causes the notification portion not to execute the alert even when the inattentive of the driver is detected.

First Embodiment

Figure 1:
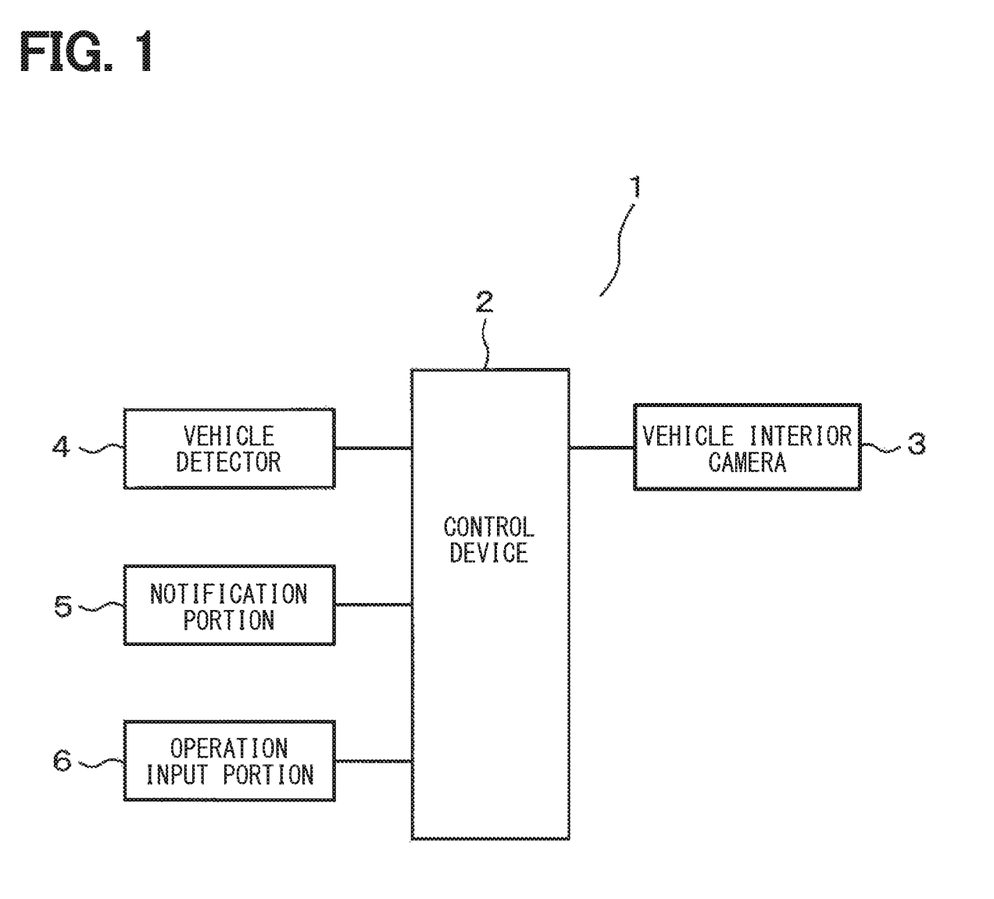
FIG. 1 is a block diagram showing an electrical configuration of a vehicle alert apparatus according to a first embodiment.

A first embodiment of the present disclosure will be described with reference to FIGS. 1 to 10. A vehicle alert apparatus 1 of the present embodiment includes a control device 2, a vehicle interior camera 3, a vehicle speed detector 4, a notification portion 5, and an operation input portion 6, as shown in FIG. 1. The control device 2 controls the entire of the vehicle alert apparatus 1, and has functions of inputting data of an image captured by the vehicle interior camera 3, inputting a vehicle speed signal detected by the vehicle speed detector 4, inputting an operation signal input by the operation input portion 6, and driving and controlling the notification portion 5. The control device 2 has each function as a drowse detector, an inattentiveness detector, and an alert controller.

The vehicle interior camera 3 serially captures the periphery of a driver face, and transmits the captured image data to the control device 2. By receiving the image data described above and executing an image recognition process on the received image data, the control device 2 detects, for example, an opening degree of a driver eyelid, a driver face direction, a driver line-of-sight direction, a driver head position, or the like. The control device 2 has a function of estimating a driver state, that is, a function as DSM (Driver Status Monitor) based on data of each detection result described above.

In a case of the present embodiment, the control device 2 has a function of determining, as a driver state, a driver unsafe state such as, for example, the drowse, the inattentiveness, or an unsafe posture, that is, an abnormal posture. When determining, for example, the "drowse" as the driver state, the control device 2 determines whether the driver is in a drowse state based on the opening degree of the driver eyelid, that is, a relative value to the opening degree average of an individual eyelid, a facial expression of the driver face, or the like. It is preferable to appropriately use a determination control of the well-known technology for this drowse determination control.

When determining, for example, the "inattentiveness" as the driver state, the control device 2 determines the driver face direction, the driver line-of-sight direction, and these duration. Specifically, the driver executes the inattentive driving when a state where the driver face direction and the driver line-of-sight direction are lateral directions inclined at, for example, 30 degrees or more with respect to the front continues for two seconds or more, for example. In the present embodiment, when the driver inattentiveness is determined, the determination is executed based on the driver face direction and the driver line-of-sight direction. Alternatively, the determination may be executed based on the driver face direction, or the determination may be executed based on the driver line-of-sight direction.

The control device 2 has the function of determining, for example, the abnormal posture, that is, the unsafe posture as the driver state. The control device 2 determines that the driver posture is the abnormal posture when a state where the driver head position is outside a preset abnormal posture determination area, that is, an area indicating a normal position of the head position continues for a set time, for example, two seconds or more.

The vehicle speed detector 4 detects a vehicle speed based on a vehicle speed pulse output from a vehicle speed sensor of the vehicle or a GPS signal output from a GPS (Global Positioning System) receiver, and transmits the detected vehicle speed signal to the control device 2.

The notification portion 5 includes a speaker, a sound output device that outputs an alert sound or the like from this speaker, a voice output device that outputs the voice such as an alert message from this speaker, a display mounted on an instrument panel, and a display control device that displays the alert message or the like on this display. The operation input portion 6 includes a touch panel placed in a screen of the display, a mechanical switch placed on a peripheral of the display, a remote controller, or the like.

In the present embodiment, the control device 2 executes control to alert or not the driver to the drowse or the inattentiveness in accordance with the vehicle speed. Therefore, it is necessary that the control device 2 accurately determines whether a vehicle speed V exceeds a preset threshold value Vth, for example, 10 km/h, specifically, the speed range of the vehicle speed Vth is any one of ranges of $0<V\leq Vth$, $Vth<V$, or $V\approx 0$, and prevents an erroneous detection.

Figure 2:
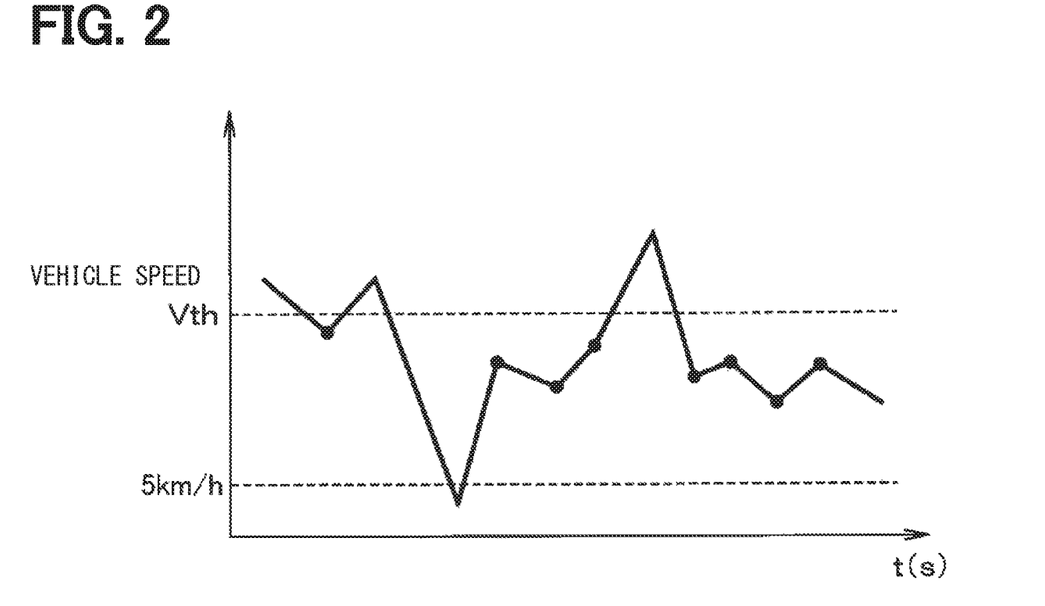
FIG. 2 is a diagram (part 1) illustrating a control of determining a vehicle speed.

Therefore, in the present embodiment, the control device 2 executes the following control in order to prevent the erroneous detection of the vehicle speed. For example, as shown in FIG. 2, when the vehicle speed is detected 10 times every 100 ms, that is, 1s and when most of the ten vehicle speed detection values are in a range close to 0, for example, a range between 5 km/h and Vth, it is determined that the speed range is a range of $0<V\leq Vth$. That is, the detection value that exceeds the Vth and is in accordance with a small number of detection times or the detection value that is lower than 5 km/h and is in accordance with a small number of detection times is ignored as noise.

Figure 3:
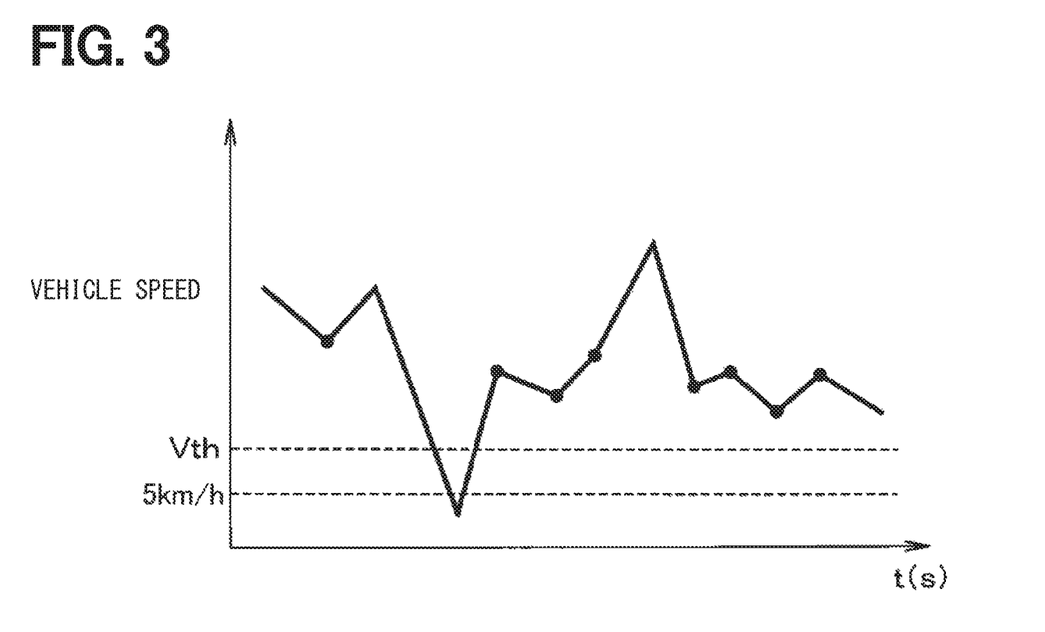
FIG. 3 is a diagram (part 2) illustrating the control of determining the vehicle speed.

As shown in FIG. 3, when the vehicle speed is detected 10 times every 100 ms, that is, 1 s and when most of the ten vehicle speed detection values exceed Vth, it is determined that the speed range is a range of $Vth<V$. That is, the detection value that is in accordance with a small number of detection times and is equal to or lower than the Vth is ignored as the noise.

In a case where it is determined that V is nearly equal to 0 ($V\approx 0$), when the vehicle speed is detected 10 times every 100 ms, that is, 1s and when most of the ten vehicle speed detection values are in the range close to 0, for example, a range lower than 5 km/h, it is determined that the speed range is a range of That is, the detection value that is in accordance with a small number of detection times and equal to or higher than 5 km/h is ignored as the noise.

When the vehicle speed is detected 10 times every 100 ms, that is, 1s and when the number of detection times of the vehicle detection values with $V\approx 0$, that is, the detection values lower than 5 km/h among the ten vehicle speed detection values is, for example, two, when the number of detection times of the vehicle speed detection values in the range of $0<V\leq Vth$ are, for example, 3 and when the number of detection times of the vehicle speed detection values in the range of $Vth<V$ are, for example, 5, the speed range of $Vth<V$ in accordance with the highest number of detection times of the vehicle detection values is determined as the vehicle speed.

The erroneous detection prevention control of the vehicle speed described above is executed by the control device 2. However, instead of this, the erroneous detection prevention control may be executed by the vehicle speed detector 4 or the like. Further, the vehicle speed is detected 10 times every 100 ms. However, it is not limited to this. For example, the vehicle speed may be detected 10 times every 1 s, that is, detected for 10 seconds. A detection timing of the vehicle speed, the number of detection times or the detection time, or the like may be appropriately changeable. Further, a chattering prevention function may be provided, that is, the speed range of the vehicle speed detected once may be ignored, for example.

Further, a driver, a user, a traveling manager, or the like can change the threshold value Vth of the vehicle to a value larger than 10 km/h or a value smaller than 10 km/h by, for example, operating the operation input portion 6. The change operation of the threshold value Vth may be preferably executed at the end of driving or the like.

In the present embodiment, an erroneous alert of the drowse alert and the inattentiveness alert of the driver based on an image recognition process result may occur. Therefore, by adding a vehicle speed determination condition, the occurrence of the erroneous alert is suppressed as much as possible. That is, the control of whether to alert is executed based on the detection result of the driver drowse, the detection result of the driver inattentiveness, or the detection result of the vehicle speed. Specifically, the vehicle speed V is divided into three speed ranges of $V\approx 0$, $0<V\leq Vth$, and $Vth<V$. Thereby, the condition for executing the drowse alert or the inattentiveness alert is set.

Figure 4:
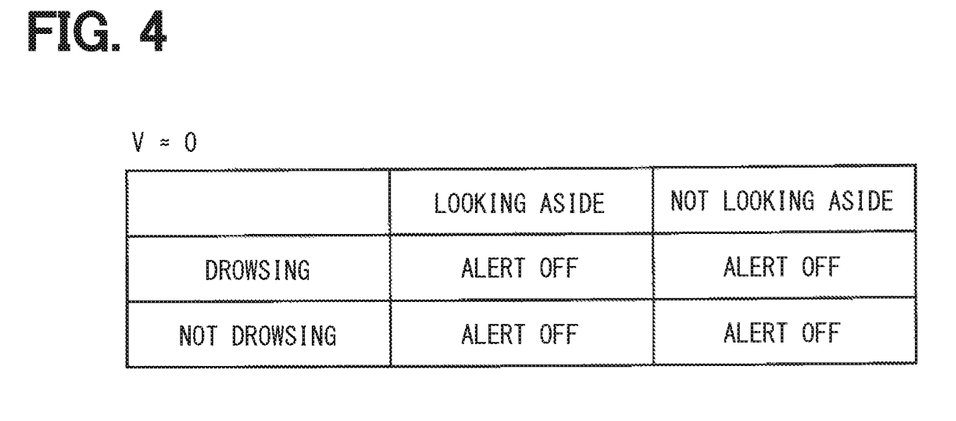
FIG. 4 is a diagram showing a table of an alert on-off relation when a speed range of the vehicle speed is in a state of V≈0.

In a case where the speed range is the range of V≈0, as shown in a table of FIG. 4, the alert is executed in regardless of whether the driver is drowsing or whether the driver is looking aside.

Figure 5:
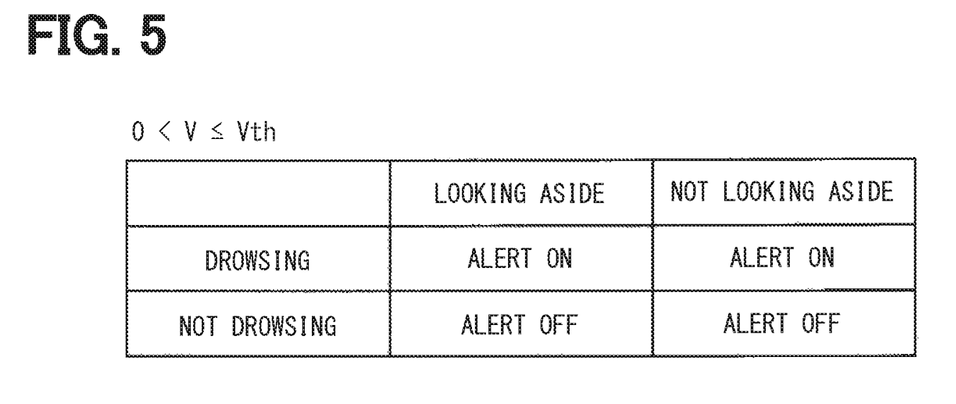
FIG. 5 is a diagram showing a table of the alert on-off relation when the speed range of the vehicle speed is in a state of 0<V≤Vth.

Next, in a case where the speed range is the range of 0<V≤Vth, as shown in a table of FIG. 5, when the driver is drowsing, the alert is executed in regardless of whether the driver is looking aside. When the driver is not drowsing, the alert is executed in regardless of whether the driver is looking aside. That is, in the case of the speed range, when the driver is looking aside without drowsing, the alert is not executed.

Figure 6:
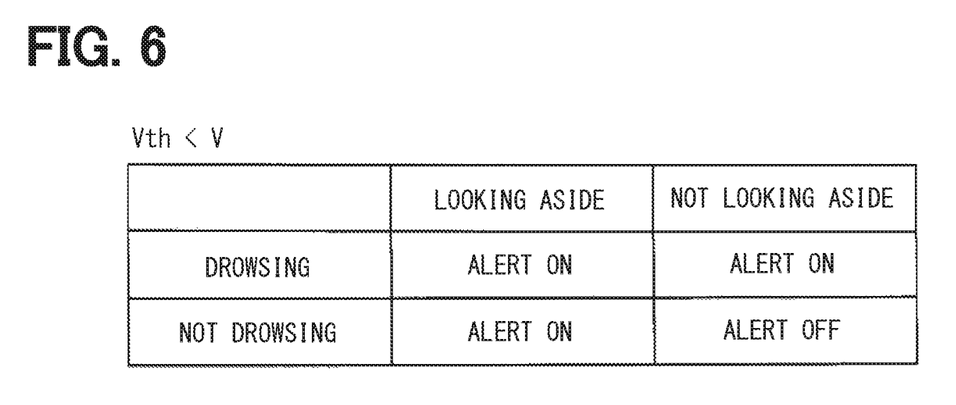
FIG. 6 is a diagram showing a table of the alert on-off relation when the speed range of the vehicle speed is in a state of Vth<V.

In a case where the speed range is the speed range of Vth<V, as shown in a table of FIG. 6, when the driver is drowsing, the alert is executed in regardless of whether the driver is looking aside. When the driver is looking aside without drowsing, the alert is executed. When the driver is not looking aside, the alert is not executed. That is, in the case of the speed range, when the driver is looking aside without drowsing, the alert is executed.

Next, the alert control of the configuration described above will be described with reference to FIGS. 7 to 10. Flowcharts of FIGS. 7 to 10 show contents of the control device 2. In a step S10 of FIG. 7, the control device 2 receives a vehicle speed detection signal from the vehicle speed detector 4, executes the erroneous detection prevention control described above based on the received vehicle speed detection signal, and determines in which of the three speed ranges the vehicle speed V is, that is, acquires the vehicle speed. The control device 2 receives the image data from the vehicle interior camera 3, and executes the image recognition process on the received image data. Thereby, the control device 2 determines the driver state, specifically, whether the driver is drowsing and whether the driver is looking aside, and stores the determination result in the memory inside the control device 2. This image process of the driver corresponds to a driver state determination control.

Figure 7:
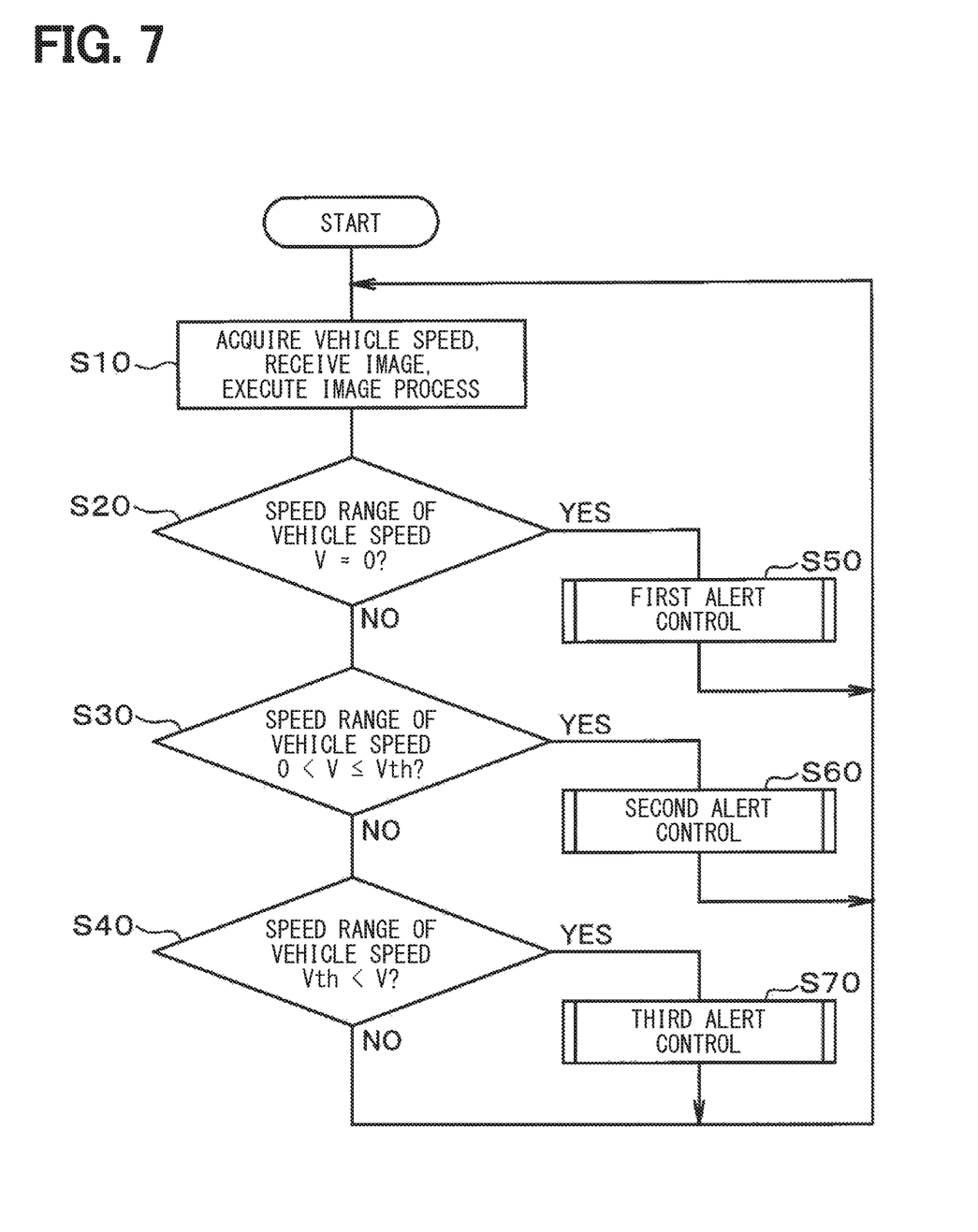
FIG. 7 is a flowchart showing a main control of an alert control.

Subsequently, the process shifts to a step S20, and it is determined whether the speed range of the vehicle speed V is the range of V≈0. Here, when the speed range is the range of V≈0 (YES), the process shifts to a step S50 and a first alert control is executed. This first alert control is described later. In the step S20 described above, when the speed range is not the range of V≈0 (NO), the process shifts to a step S30.

In the step S30, it is determined whether the speed range of the vehicle speed V is the range of 0<V≤Vth. Here, when the speed range is the range of 0<V≤Vth (YES), the process shifts to a step S60 and a second alert control is executed. This second alert control is described later. In the step S30 described above, when the speed range is not the range of 0<V≤Vth (NO), the process shifts to a step S40.

In the step S40, it is determined whether the speed range of the vehicle speed V is the range of Vth<V. Here, when the speed range is the range of Vth<V (YES), the process shifts to a step S70 and a third alert control is executed. This third alert control is described later. In the step S40 described above, when the speed range is not the range of Vth<V (NO), the process returns to the step S10 and the processes described above are repeatedly executed. In the present embodiment, the control of FIG. 7, that is, the vehicle speed determination control is repeatedly executed at a predetermined cycle.

Next, the first alert control of the step S50 will be described with reference to FIG. 8. In a step S110 of FIG. 8, the control device 2 receives the image data from the vehicle interior camera 3, and executes the image process on the received image data. Thereby, the control device 2 determines the driver state, specifically, whether the driver is drowsing and whether the driver is looking aside, and stores the determination result in the memory inside the control device 2. This image process of the driver, that is, the driver state determination control has been already executed in the step S10 of FIG. 7. Therefore, the process of the step S110 may be omitted. When the image process is executed in the step S110, the image process in the step S10 of FIG. 7 may be omitted.

Next, the process shifts to a step S120, and it is determined whether the driver is drowsing. Here, when the driver is drowsing (YES), the process shifts to a step S130 and it is determined whether the driver is looking aside. Here, when the driver is looking aside (YES), the process shifts to a step S140 and the alert of the drowse and the inattentiveness is turned off, that is, the alert is not executed. Thereby, the first alert control ends, and the process returns to the main control of FIG. 7.

In the step S120 described above, when the driver is not drowsing (NO), the process shifts to a step S140. The alert of the drowse and the inattentiveness is turned off, and the first alert control ends.

In the step S130 described above, when the driver is not looking aside (NO), the process shifts to the step S140. The alert of the drowse and the inattentiveness is turned off, and the first alert control ends.

In the first alert control, the alert is not executed in regardless of whether the driver is drowsing and whether the driver is looking aside. Therefore, in the processes of the steps S110 to S130 may be omitted and the process of only the step S140 may be executed.

Next, the second alert control in the step S60 will be described with reference to FIG. 9. In a step S210 of FIG. 9, the control device 2 receives the image data from the vehicle interior camera 3, and executes the image process on the received image data. Thereby, the control device 2 determines the driver state, specifically, whether the driver is drowsing and whether the driver is looking aside, and stores the determination result in the memory inside the control device 2. This image process of the driver, that is, the driver state determination control has been already executed in the step S10 of FIG. 7. Therefore, the process of the step S210 may be omitted. When the image process is executed in the step S210, the image process in the step S10 of FIG. 7 may be omitted.

Next, the process shifts to a step S220, and it is determined whether the driver is drowsing. Here, when the driver is drowsing (YES), the process shifts to a step S230 and the alert of the drowse and the inattentiveness is turned on, that is, the alert is executed. In this case, by executing the drive control of the notification portion 5, the control device 2 causes the speaker to output an alert sound for alerting the driver to the drowse, the alert voice for alerting the driver to the drowse, or the like, or displays the alert message for alerting the driver to the drowse on the display.

Thereby, the second alert control ends, and the process returns to the main control of FIG. 7.

In the step S220 described above, when the driver is not drowsing (NO), the process shifts to a step 240 and it is determined whether the driver is looking aside. Here, when the driver is looking aside (YES), the process shifts to a step S250 and the alert of the drowse and the inattentiveness is turned off, that is, the alert is not executed. Thereby, the second alert control ends, and the process returns to the main control of FIG. 7.

In the step S240 described above, when the driver is not looking aside (NO), also in this case, the process shifts to the step S250. The alert of the drowse and the inattentiveness is turned off, and the second alert control ends.

In the second alert control, when the driver is not drowsing, the alert is not executed in regardless of whether the driver is looking aside. Therefore, the process of the step S240 may be omitted. When the determination is "NO" in the step S220, the process of the step S250 may be executed.

Next, the third alert control in the step S70 will be described with reference to FIG. 10. In a step S310 of FIG. 10, the control device 2 receives the image data from the vehicle interior camera 3, and executes the image process on the received image data. Thereby, the control device 2 determines the driver state, specifically, whether the driver is drowsing and whether the driver is looking aside, and stores the determination result in the memory inside the control device 2. This image process of the driver, that is, the driver state determination control has been already executed in the step S10 of FIG. 7. Therefore, the process of the step S310 can be omitted. When the image process is executed in the step S310, the image process in the step S10 of FIG. 7 may be omitted.

Next, the process shifts to a step S320, and it is determined whether the driver is drowsing. Here, when the driver is drowsing (YES), the process shifts to a step S330 and the alert of the drowse and the inattentiveness is turned on, that is, the alert is executed. In this case, by executing the drive control of the notification portion 5, the control device 2 causes the speaker to output the alert sound for alerting the driver to the drowse, the alert voice for alerting the driver to the drowse, or the like, or displays the alert message for alerting the driver to the drowse on the display. Thereby, the third alert control ends, and the process returns to third main control of FIG. 7.

In the step S320 described above, when the driver is not drowsing (NO), the process shifts to a step 340 and it is determined whether the driver is looking aside. Here, when the driver is looking aside (YES), the process shifts to a step S330 and the alert of the drowse and the inattentiveness is turned on, that is, the alert is executed. Thereby, the third alert control ends, and the process returns to third main control of FIG. 7.

In the step S340 described above, when the driver is not looking aside (NO), also in this case, the process shifts to the step S350. The alert of the drowse and the inattentiveness is turned off, that is, the alert is not executed. Thereby, the third alert control ends, and the process returns to third main control of FIG. 7.

Figure 8:
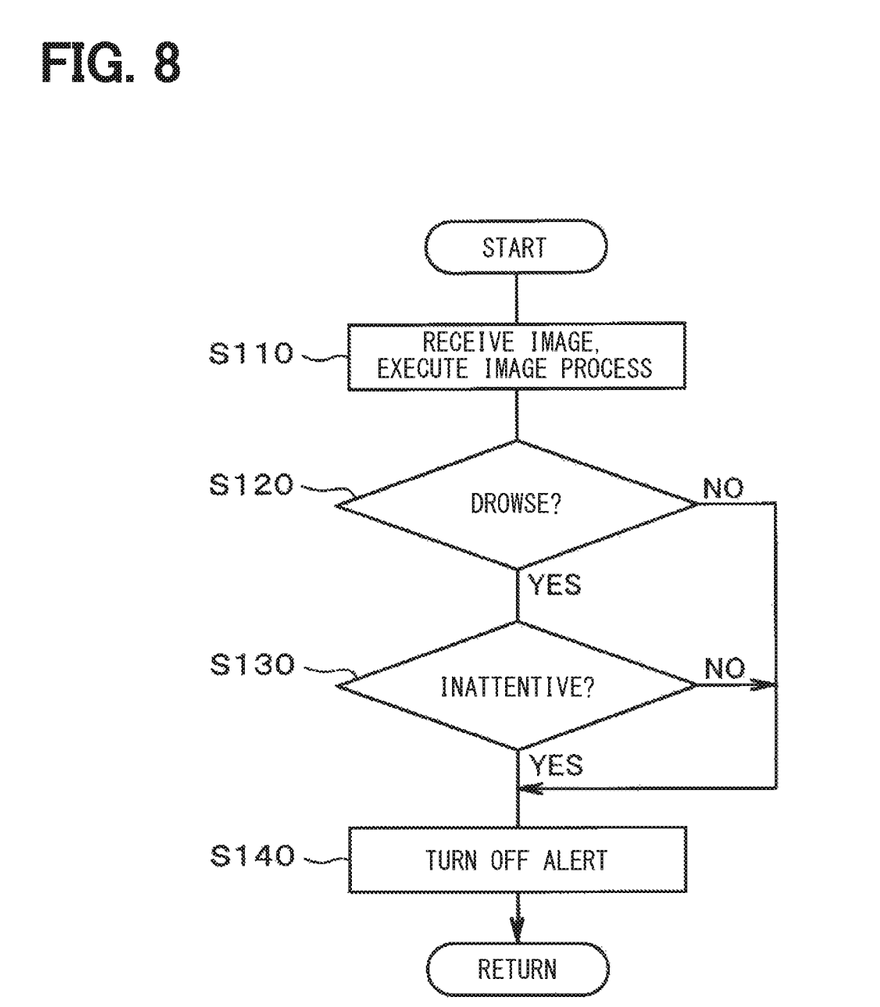
FIG. 8 is a flowchart showing a first alert control.
Figure 9:
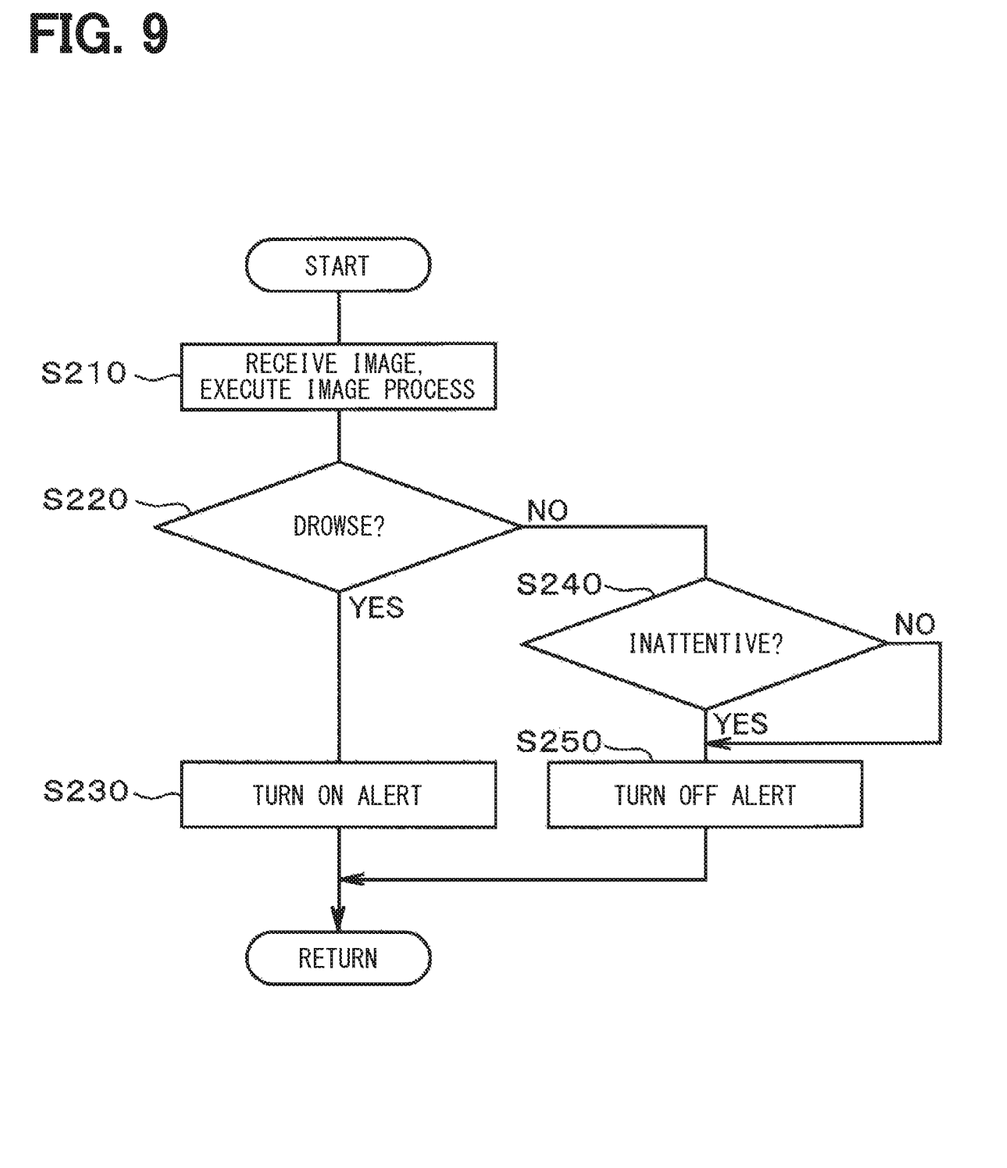
FIG. 9 is a flowchart showing a second alert control.
Figure 10:
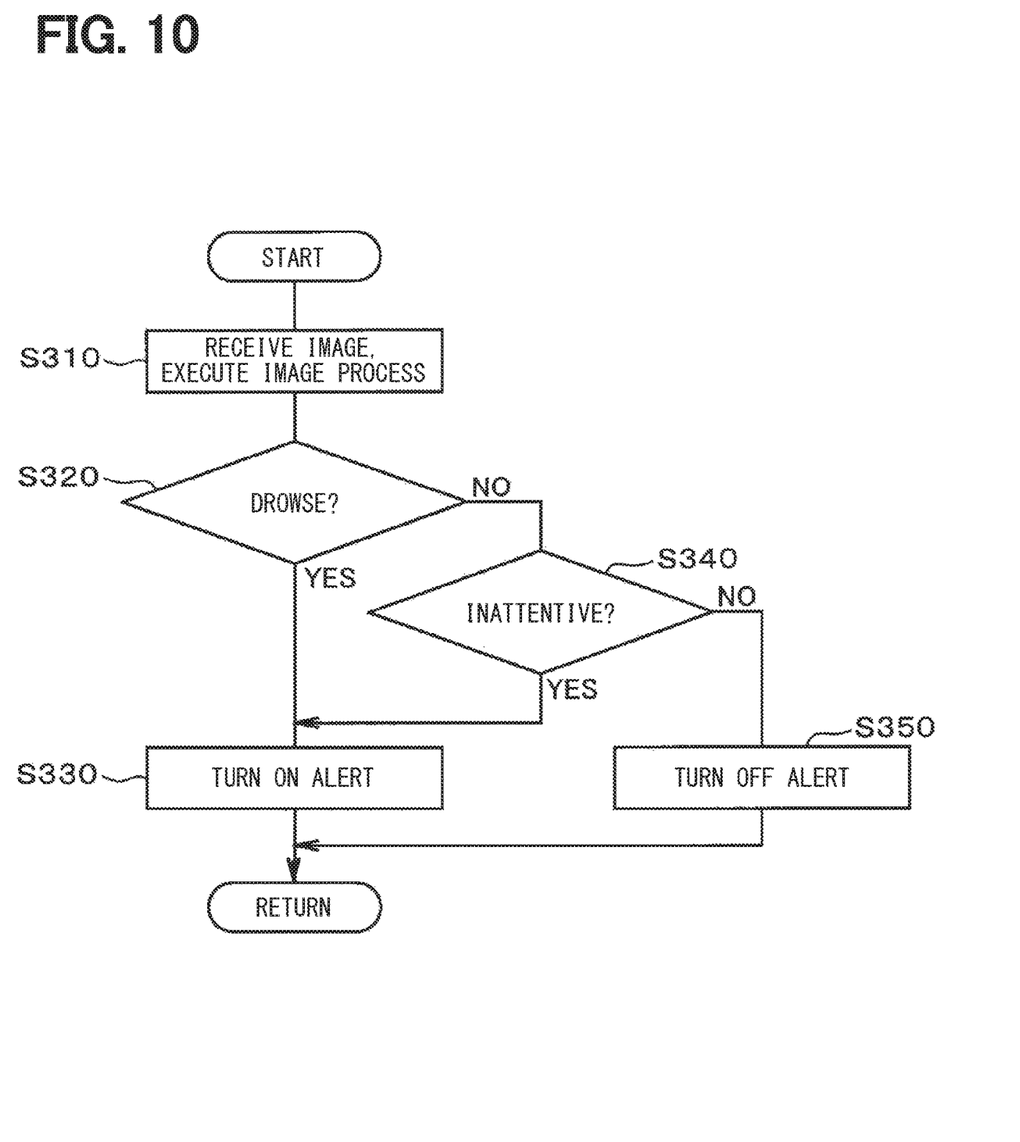
FIG. 10 is a flowchart showing a third alert control.

In the present embodiment, each control of FIGS. 8, 9, and 10, that is, the driver state determination control is repeatedly executed at a predetermined cycle. The vehicle speed determination control of FIG. 7 and each driver state determination control of FIGS. 8, 9, and 10 are repeatedly executed in synchronization.

In each embodiment described above, the vehicle speed determination control is executed first. Thereafter, the driver state determination control, that is, the determination control for the drowse, the inattentiveness of the driver, or the like is executed. However, alternatively, the driver state determination control may be executed first, and thereafter the vehicle speed determination control may be executed. Even such a configuration can provide the similar operation effect.

In the present embodiment having such a configuration, when the drowse or the inattentiveness of the driver is detected, the notification portion executes the alert. The alert execution by the notification portion is controlled based on the detection result of the driver drowse, the detection result of the driver inattentiveness, or the detection result of the vehicle speed. According to this configuration, it may be possible to execute the alert when the driver drowses or looks aside. Further, it may be possible not to execute the alert when the alert is unnecessary. Therefore, it may be possible to prevent the situation where the driver feels troublesome with the alert as much as possible.

In the present embodiment, the threshold value Vth is changeable. Therefore, the determination level of whether to execute the alert can be customized so as to match the sense of the driver, that is, the user. Thereby, the erroneous alert is reduced, and it may be possible to reduce the troublesomeness of the driver. Accordingly, it may be possible to improve the usability as compared with the conventional configuration.

Further, in the present embodiment, in the case where the vehicle speed is equal to or lower than the threshold value Vth, when the drowse of the driver is detected, the alert is executed. Even when the inattentiveness of the driver is detected, the alert is not executed. According to this configuration, when the vehicle is moving at an extremely low speed in order to search a parking position or the like in a parking lot, the alert is not executed. Therefore, it may be possible to prevent the driver from feeling troublesome with the alert.

In the present embodiment, in the case where the vehicle speed is higher than the threshold value Vth, when the drowse of the driver is detected or the inattentiveness of the driver is detected, the alert is executed. According to this configuration, in a case where the vehicle is traveling at the normal vehicle speed, when the drowse or the inattentiveness is detected, the alert is executed. Therefore, it may be possible to prevent the drowse driving or the inattentiveness driving.

In the present embodiment, in the case where the vehicle speed is 0 or close to 0, even when the drowse of the driver is detected, the alert is not executed. Therefore, in the case where the vehicle speed is 0 or close to 0, the alert of the drowse or the inattentiveness is not executed. Thereby, it may be possible to prevent the driver from feeling troublesome with the alert.

Second Embodiment

Figure 11:
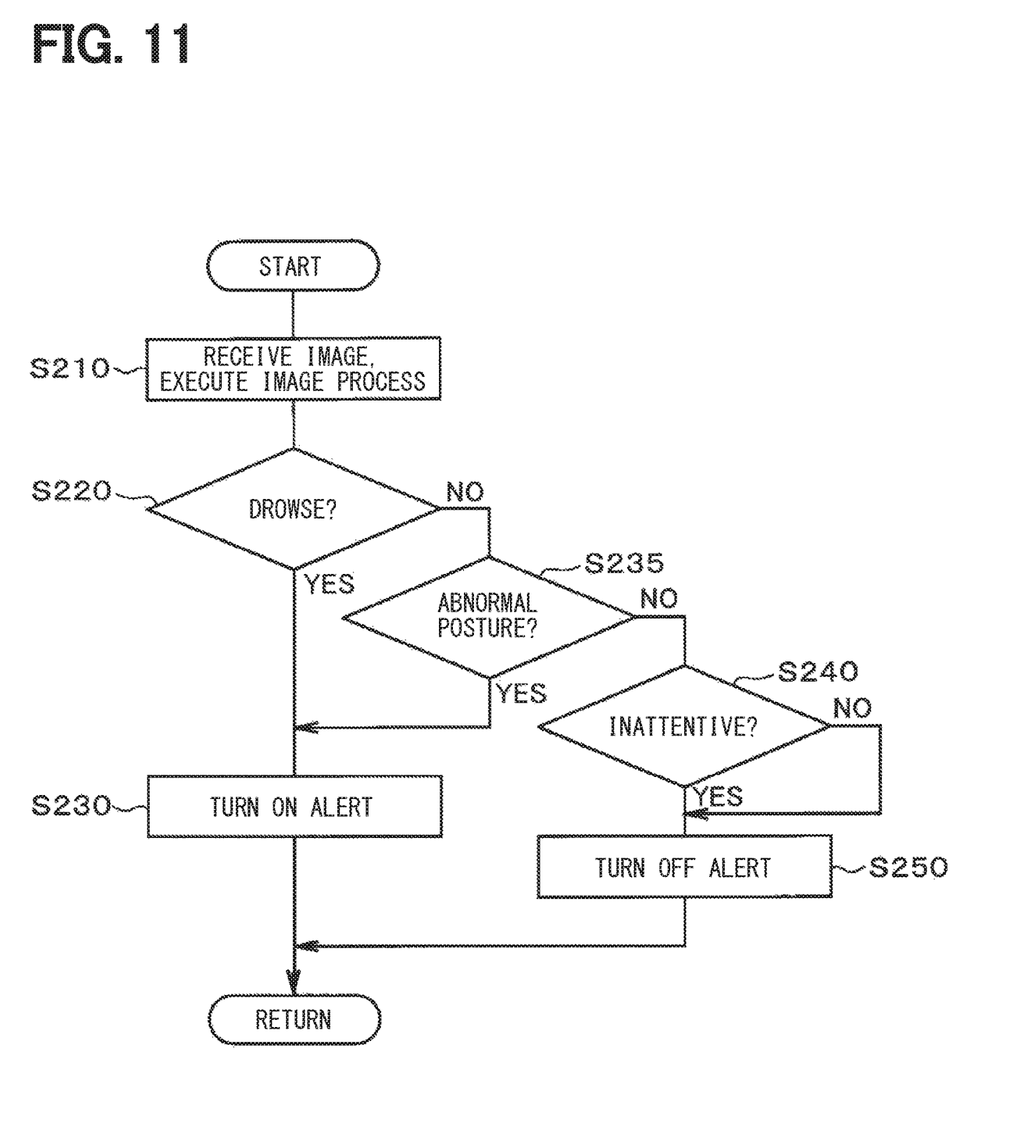
FIG. 11 is a flowchart showing a second alert control according to a second embodiment.
Figure 12:
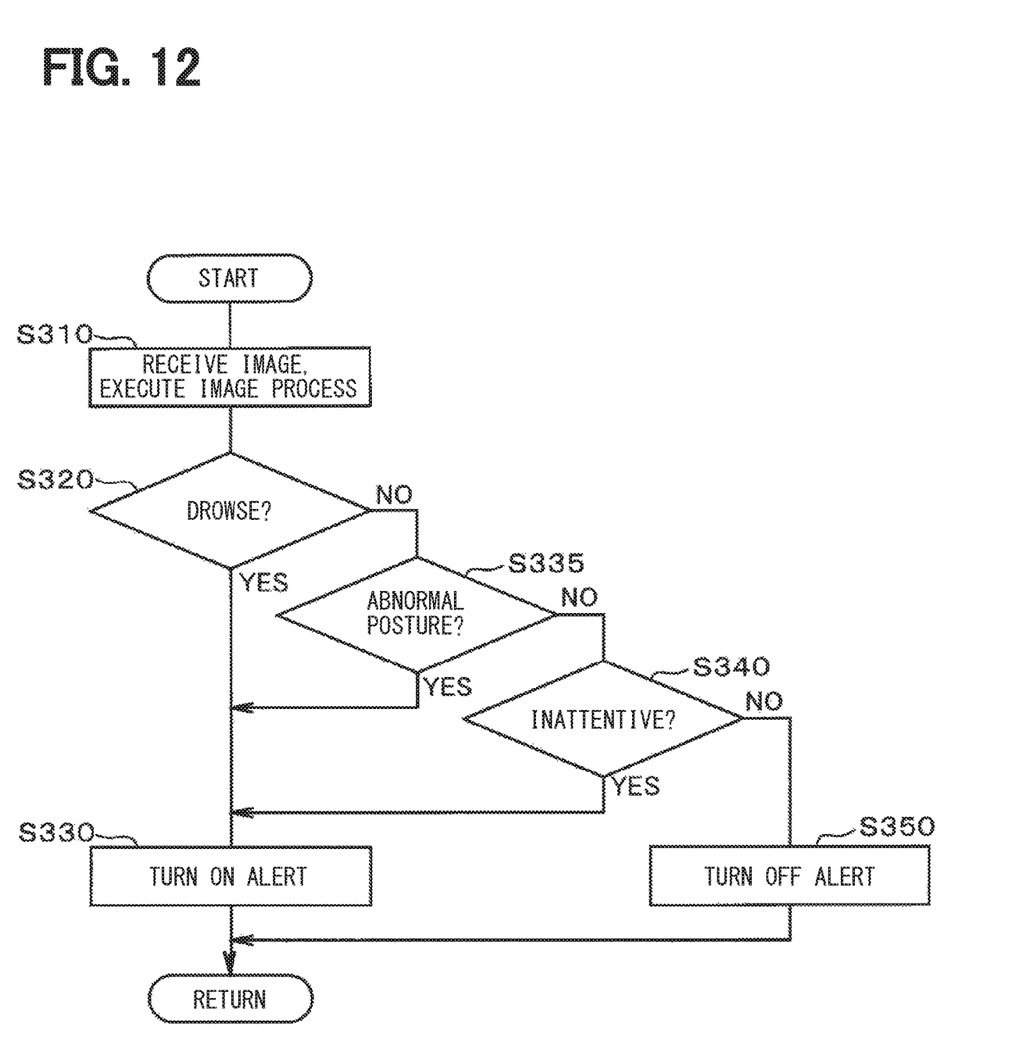
FIG. 12 is a flowchart showing a third alert control.

FIG. 11 and FIG. 12 show a second embodiment. A configuration identical to that according to the first embodiment is denoted by an identical reference sign. In a second embodiment, in addition to the detection of the drowse or the inattentiveness of the driver, an abnormal posture of the driver is detected and the alert is executed. The second alert control of the step S60 in the first embodiment, that is, the flowchart of FIG. 9 and the third alert control of the step S70, that is, the flowchart of FIG. 10 are changed as described below.

First, a second alert control of the second embodiment will be described with reference to FIG. 11. Each process of steps S210, S220, and S230 in FIG. 11 is executed similarly to the first embodiment. When the driver is not drowsing in the step S220 (NO), the process shifts to a step S235 and it is determined whether the driver posture is the abnormal posture. A detection process of the driver abnormal posture is executed in the image process of the step S210 or the step S10 in FIG. 7, that is, the driver state determination control. The detection result is stored in the memory inside the control device 2.

In the step S235 described above, when the driver posture is the abnormal posture (YES), the process shifts to the step S230 and the alert is turned on, that is, the alert of the drowse, the inattentive, and the abnormal posture is executed. In the step S235 described above, when the driver posture is the abnormal posture (NO), the process shifts to the step S240 and it is determined whether the driver is looking aside. Each process of the steps S240 and S250 is executed similarly to the first embodiment.

Next, a third alert control of the second embodiment will be described with reference to FIG. 12. Each process of steps S310, S320, and S330 in FIG. 12 is executed similarly to the first embodiment. In the step S320, when the driver is not drowsing (NO), the process shifts to the step S335 and it is determined whether the driver posture is the abnormal posture. A detection process of the driver abnormal posture is executed in the image process of the step S310 or the step S10 in FIG. 7, that is, the driver state determination control. The detection result is stored in the memory inside the control device 2.

In the step S335 described above, when the driver posture is the abnormal posture (YES), the process shifts to the step S330 and the alert is turned on, that is, the alert of the drowse, the inattentive, and the abnormal posture is executed. In the step S335 described above, when the driver posture is the abnormal posture (NO), the process shifts to the step S340 and it is determined whether the driver is looking aside. Each process of the steps S340 and S350 is executed similarly to the first embodiment.

Configurations according to the second embodiment other than those described above are similar to corresponding configurations according to the first embodiment. Accordingly, the second embodiment can provide the operation effect similar to the first embodiment. In particular, in the second embodiment, the abnormal posture of the driver is detected. Therefore, when the driver posture is abnormal, it may be possible to alert the driver to the abnormal posture. It may be possible to encourage the driver to take a correct posture.

In each of the embodiments described above, the initial value of the threshold value Vth, that is, a default is set to 10 km/h. However, it may be set to a different speed. In each of the embodiments described above, the threshold value Vth can be changed by the user, the traveling manager, or the like. However, it is not limited to this. For example, the threshold value Vth may be changed as follows.

After the driving of the vehicle ends, the driver inputs information regarding the troublesomeness with the alert and the threshold value Vth is adjusted each driver based on the input information regarding the troublesomeness. Specifically, when the driving of the vehicle ends and the driver gets off the vehicle, for example, a message of "Is the frequency of the alert troublesome?" is displayed on the screen of the display. Here, when the driver operates, for example, the touch panel of the operation input portion 6 and selects "YES" or "NO", the threshold value Vth is changed in accordance with the selection result. Thereby, the threshold value Vth is reflected in the alert process at the next driving.

For example, when the driver selects "YES", the control device 2 changes the threshold value Vth so as to increase the threshold value Vth by 5 km/h, for example. That is, the control device 2 sets the threshold value Vth to Vth=Vth+5 km/h, and stores the changed threshold value Vth in the memory inside the control device 2. On the contrary, when the driver selects "NO", the control device 2 holds the threshold value Vth at the current value, and uses the same threshold value Vth for the alert process at the next driving.

When "NO" continues many times, it is assumed that there is a large amount of undetected drowse or the like. Therefore, the threshold value Vth is changed to a small value and thereby the detection of the drowse or the like is eased. For example, when the response of "NO" continues for five times of driving, the threshold value Vth is changed to decrease, for example, by 5 km/h, that is, the threshold value Vth is set to Vth=Vth−5 km/h. The changed threshold value Vth is stored in the memory inside the control device 2, for example, a non-volatile memory. Thereby, at the next driving, the changed threshold value Vth is read at the starting of the detection control, and used for the detection control. The control device 2 and the operation input portion 6 have a function as a threshold value change portion.

Each of the embodiments described above may include a configuration of receiving a feedback of whether the alert frequency or the like is appropriate from the driver after the driving of the vehicle ends. In such a configuration, for example, when it is responded that the alert frequency or the like is appropriate, the alert matches the user sense. Therefore, it is preferable that the threshold value Vth is not changed, and is maintained.

In each of the embodiments described above, it is not determined whether the vehicle is in a traffic jam, and a control in accordance with a case where it is determined that the vehicle is in the traffic jam is not executed. On the other hand, in a case where it is determined whether the vehicle is in the traffic jam and a case where it is determined that the vehicle is in the traffic jam, even when the speed range of the vehicle speed V is the range of V≈0(0), it is preferable that the alert is not turned off and the alert is continued. Only the vehicle speed detector cannot accurately determine the traffic jam. Therefore, it is preferable that traffic jam information is obtained by performing VICS (registered trademark) communication and determination of whether the vehicle is in the traffic jam is performed. However, in such a configuration. It is necessary to cooperate with a different device, and therefore a manufacturing cost may increase. Further, when, for example, the vehicle is on the road based on the position information of the vehicle in accordance with the GPS signal, the alert cannot be turned off and the alert can be continued. However, when the vehicle is not on the road, the alert can be turned off.

In each of the embodiments described above, in order to simplify the entire system configuration and a detection algorithm of the drowse or the like, when the speed range of the vehicle speed V is the range of V≈0, it is not distinguished whether the vehicle stops or the vehicle is in the heavy traffic jam, and the alert is turned on or off based on the vehicle speed. According to this configuration, in a case of the heavy traffic jam, when the vehicle moves a little, the speed range of the vehicle speed V is the range of 0<V≤Vth. Therefore, the alert at the time of detecting the drowse is turned on, and it is assumed that there is no practical difficulties.

Although the present disclosure has been described in accordance with the embodiments, it is understood that the present disclosure is not limited to such embodiments or structures. The present disclosure covers various modifications and equivalent arrangements. In addition, various combinations and forms, and further, other combinations and forms including only one element, or more or less than these elements are also within the scope and the spirit of the present disclosure.

The invention claimed is:

1. A vehicle alert apparatus comprising:
a drowse detector configured to detect drowse of a driver;
an inattentiveness detector configured to detect inattentiveness of the driver;
a vehicle speed detector configured to detect a vehicle speed;
a notification portion configured to execute an alert for the driver; and
an alert controller configured to control an execution of the alert executed by the notification portion based on a detection result of the drowse of the driver, a detection result of the inattentiveness of the driver, or the detection result of the vehicle speed,
wherein:
the alert controller is configured to control the alert in accordance with a determination level for the detection result of the vehicle speed;
the determination level is sectioned by a threshold value of the vehicle speed; and
in a case where the vehicle speed is equal to or lower than the threshold value, the alert controller is configured to cause the notification portion to execute the alert when the drowse of the driver is detected, and cause the notification portion not to execute the alert even when the inattentiveness of the driver is detected, wherein
the threshold value is changeable by the driver,
the vehicle alert apparatus further comprises an input portion through which the driver inputs information regarding troublesomeness with the alert,
the alert controller is further configured to change the threshold value based on the information input by the driver through the input portion,
the input portion is further configured to ask the driver as to whether the alert was troublesome at the end of driving, and
the driver inputs the information by answering to the input portion.

2. The vehicle alert apparatus according to claim 1, wherein: in a case where the vehicle speed is higher than the threshold value, the alert controller is configured to cause the notification portion to execute the alert when the drowse of the driver is detected or when the inattentiveness of the driver is detected.

3. The vehicle alert apparatus according to claim 1, wherein: in a case where the vehicle speed is equal to zero or close to zero, the alert controller is configured to cause the notification portion not to execute the alert even when the drowse of the driver is detected or even when the inattentiveness of the driver is detected.

4. The vehicle alert apparatus according to claim 1, wherein: the alert includes alert for the drowse and alert for the inattentiveness;
the alert for the drowse or the alert for the inattentiveness is executed based on the detection result of the drowse, the detection result of the inattentiveness, and the detection result of the vehicle speed; and
in the case where the vehicle speed is equal to or lower than the threshold value, the alert controller causes the notification portion to execute the alert of the drowse when the drowse of the driver is detected, and causes the notification portion not to execute the alert of the inattentiveness even when the inattentiveness of the driver is detected.

5. The vehicle alert apparatus according to claim 1, wherein the alert controller is further configured to decrease the threshold value when the driver consecutively answers to the input portion predetermined times that the alert was not troublesome.

6. A vehicle alert apparatus comprising:
one or more processors; and
a memory coupled to the one or more processors and storing program instructions that when executed by the one or more processors cause the one or more processors to at least:
detect drowse of a driver;
detect inattentiveness of the driver;
detect a vehicle speed;
execute an alert for the driver;
control execution of the alert executed based on a detection result of the drowse of the driver, a detection result of the inattentiveness of the driver, or the detection result of the vehicle speed; and
control the alert in accordance with a determination level for the detection result of the vehicle speed,
wherein:
the determination level is sectioned by a threshold value of the vehicle speed; and
in a case where the vehicle speed is equal to or lower than the threshold value, the one or more processors are configured to execute the alert when the drowse of the driver is detected, and are configured not to execute the alert even when the inattentiveness of the driver is detected, wherein
the threshold value is changeable by the driver,
the vehicle alert apparatus further comprises an input portion through which the driver inputs information regarding troublesomeness with the alert,
the one or more processors are further programmed to change the threshold value based on the information input by the driver through the input portion,
the input portion is further configured to ask the driver as to whether the alert was troublesome at the end of driving, and
the driver inputs the information by answering to the input portion.

7. The vehicle alert apparatus according to claim 6, wherein:
the alert includes alert for the drowse and alert for the inattentiveness;
the alert for the drowse or the alert for the inattentiveness is executed based on the detection result of the drowse, the detection result of the inattentiveness, and the detection result of the vehicle speed; and
in the case where the vehicle speed is equal to or lower than the threshold value, the one or more processors execute the alert of the drowse when the drowse of the driver is detected, and do not execute the alert of the inattentiveness even when the inattentiveness of the driver is detected.

* * * * *